(12) United States Patent
Eslambolchi et al.

(10) Patent No.: US 6,353,320 B1
(45) Date of Patent: Mar. 5, 2002

(54) CONVEYANCE LOCATING SYSTEM AND METHOD FOR MULTIPLE CONVEYANCES ON THE SAME RIGHT-OF-WAY

(75) Inventors: Hossein Eslambolchi, Los Altos Hills, CA (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/658,748

(22) Filed: Sep. 13, 2000

(51) Int. Cl.[7] ........................... G01R 19/00; G01V 3/08; G01V 3/10
(52) U.S. Cl. ......................................... 324/326; 324/67
(58) Field of Search .................... 324/326, 67, 66, 324/228, 232, 327, 329, 539, 541, 543, 544

(56) References Cited

U.S. PATENT DOCUMENTS

| | | | | |
|---|---|---|---|---|
| 5,627,474 A | * | 5/1997 | Baudisch | 324/539 |
| 5,644,237 A | * | 7/1997 | Eslambolchi et al. | 324/326 |
| 5,754,049 A | * | 5/1998 | Howell | 324/326 |
| 5,798,644 A | * | 8/1998 | Eslambolchi et al. | 324/326 |
| 5,844,405 A | * | 12/1998 | Eslambolchi et al. | 324/67 |

* cited by examiner

*Primary Examiner*—Jay Patidar
*Assistant Examiner*—Reena Aurora
(74) *Attorney, Agent, or Firm*—Robert B. Levy

(57) ABSTRACT

A service provider that buries multiple utility conveyances (12a. 12b and 12c) along a common right of way (14) may facilitate their location via a technician (24) by impressing a pulsed confirmation signal (23) on each conveyance in addition to a conventional locate signal (16). The pulsed confirmation signal is uniquely identifies that conveyance, but also contains information that identifies the total number of conveyances and their relationship with each other.

7 Claims, 1 Drawing Sheet

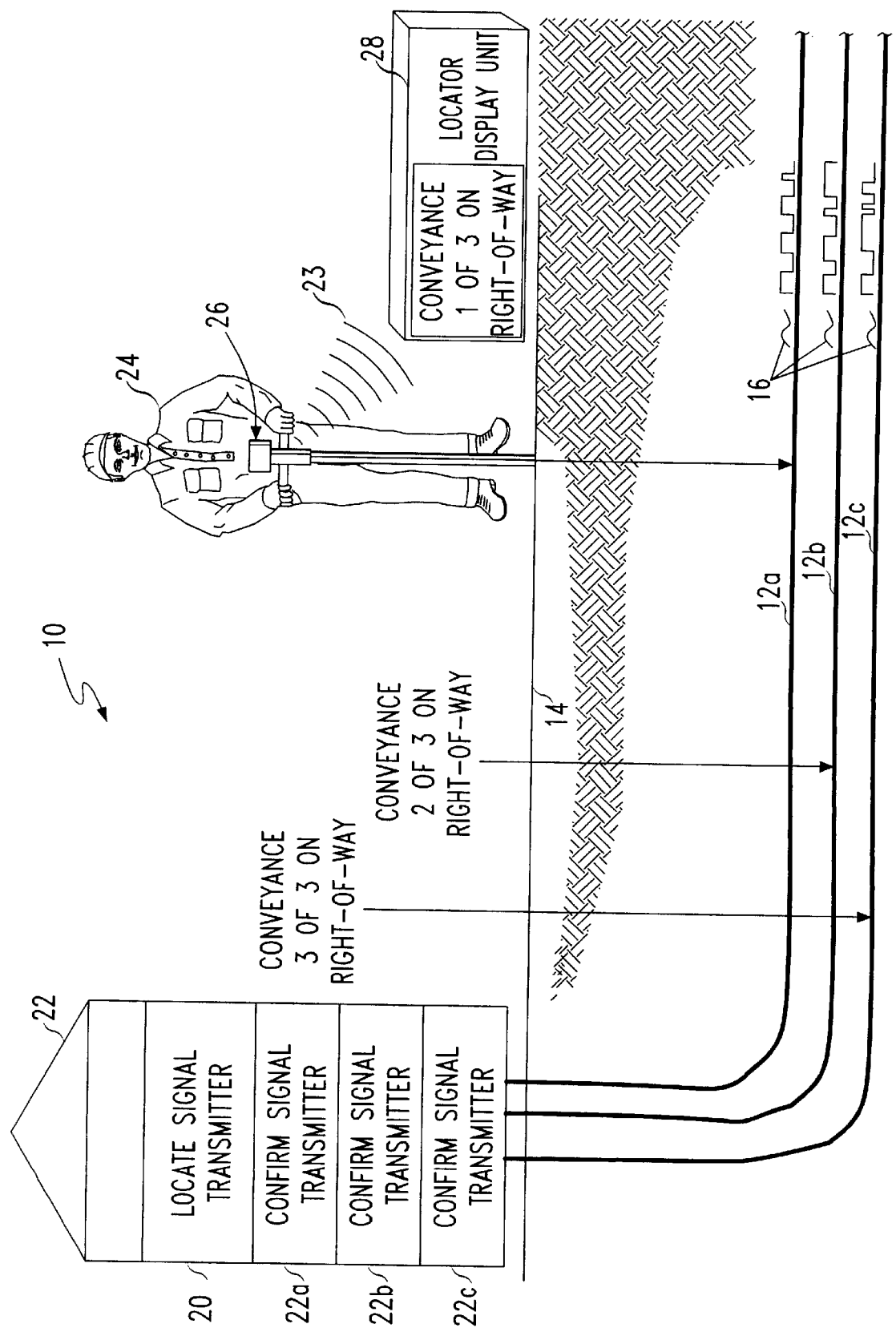

CONVEYANCE LOCATING SYSTEM AND METHOD FOR MULTIPLE CONVEYANCES ON THE SAME RIGHT-OF-WAY

TECHNICAL FIELD

This invention relates to a technique for locating each of a plurality of buried utility conveyances belonging to the same service provider.

BACKGROUND ART

Many utilities and telecommunication service providers such as AT&T, bury their pipes and cables hereinafter, "utility conveyances") underground, especially in urban environments, both for reasons for safety and esthetics. The service provider undertaking burial of a conveyance (or the contractor working on behalf of the provider) will typically map the location of the conveyance to facilitate subsequent repair. While such mapping provides a general indication of the location of the buried conveyance, greater precision often becomes necessary, especially when an excavating contractor seeks to excavate in an area in close proximity to the conveyance. For this reason, many service providers that maintain underground utility conveyances such as AT&T employ electromagnetic signaling to precisely locate a buried conveyance in advance of any nearby excavation.

To precisely locate a buried conveyance via electromagnetic signaling, the service provider will impress on the conveyance a locating signal whose frequency is unique to that service provider. To locate a conveyance, a technician employs a receiver, such as an LMS 4 receiver manufactured by Radiodetection, Inc of Mahwah, N.J., to detect the particular locating signal radiated by the conveyance of interest.

In many instances, several buried utility conveyances will run along the same right-of-way. Attempting to locate a specific one of such buried conveyances can prove problematic because the locating signals of adjacent conveyances often interfere, thereby producing "false" locates. As disclosed in our U.S. Pat. No. 5,644,237, issued Jul. 1, 1997, and assigned in the name of AT&T, we have greatly reduced the incidence of false locates by impressing a pulsed confirmation signal on the conveyance in addition to the conventional locate signal. The confirmation signal is unique to the conveyance so that by monitoring for both the locate and confirmation signals, a technician can precisely locate a particular conveyance of interest.

Often, a single service provider will bury several conveyances along the same right-of-way. While the locating technique claimed in our '237 patent allows a technician to locate an individual conveyance running along such a right-of-way, the technique provides no mechanism for alerting the technician of the total number of conveyances on the same right-of-way belonging to the same service provider. Thus, a technician may locate one or even two conveyances belonging to a service provider, but not know additional that conveyances exist which the technician must locate as well.

Thus, there is need for a technique that provides additional information to a technician regarding the number of buried conveyances of a single service provider running along a common right-of-way.

BRIEF SUMMARY OF THE INVENTION

Briefly, in accordance with a preferred embodiment, the present invention provides a method for identifying multiple buried conveyances of a single service provider running along a common right-of-way. The method of the invention is practiced by impressing a locate signal of a particular frequency on each buried conveyance of the same service provider on common right-of-way. In addition, each buried conveyance of the same service provider also carries a unique pulsed confirmation signal specific to that conveyance. In accordance with the present invention, the pulsed confirmation signal on each conveyance not only identifies the conveyance itself but also provides an indication of the number of other conveyances belonging to the same provider on the right-of-way. The pulsed confirmation signal on each buried conveyance will indicate its particular relationship (e.g., the first, second, third, etc.) to the total number of such conveyances. Thus, when a technician receives both the locate and confirmation signals via a receiver designed for this purpose to locate one of the buried conveyances of the same service provider, the technician will immediately know how many other conveyances belong to the same provider and also require location.

DESCRIPTION OF THE DRAWING

FIG. 1 depicts a block schematic diagram of a system in accordance with a referred embodiment of the invention for locating multiple buried utility conveyances belonging to the same service along the same right-of-way.

DETAILED DESCRIPTION

FIG. 1 illustrates a system 10, in accordance with the invention, for locating each of a plurality of buried under ground utility conveyances, as exemplified by conveyances 12a, 12b and 12c, maintained by the same service provider, such as AT&T, and running along a common right-of-way 14. In the illustrated embodiment, the buried conveyances 12a, 12b and 12c each comprise a cable having at least one metallic member (not shown) such as a shield, for carrying electromagnetic signals for locating purposes. Rather than comprise a cable, one or more of the conveyances 12a, 12b, and 12c could comprise a metallic pipe or a plastic pipe having a metallic member (not shown) for carrying electromagnetic signals for locating purposes. While FIG. 1 depicts only three conveyances 12a, 12b and 12c, a single service provider could have a greater or lesser number of such conveyances running along the right-of-way 14.

The metallic member of each of the conveyances 12a, 12b, and 12c carries a locating signal, represented by waveform 16, whose frequency is unique to the service provider. For example, AT&T alone uses 440 Hz as it's locating frequency. A locating signal transmitter 20 serves to impress the locating signal 16 on each of the conveyances 12a, 12b, and 12c. In practice, the locating signal transmitter 20 resides in a facility 22 at which the conveyances 12a, 12b, and 12c terminate.

In accordance with the teachings of our U.S. Pat. No. 5,644,237, the facility 22 also includes confirmation signal transmitters 22a, 22b and 22c, each impressing a pulsed confirmation signal, represented by waveform 23, on a corresponding one of the conveyances 12a, 12b and 12c that is unique thereto. As taught in our '237 patent, the confirmation signal 24 contains information indicative of identity of the particular conveyance on which it is impressed. Thus, a technician 24, using a receiver 26 of the type described in our '237 patent can locate a particular conveyance by detecting for the locating signal 16. Once the technician has generally located the particular conveyance, then the technician 24 will use the receiver 26 to detect the confirmation signal 23 and confirm the identity of the conveyance. In practice, the receiver 26 will cause a locator display unit 28 to display the information embodied in the confirmation signal 23.

While the locating technique described in our '237 patent provides for more precise location of a conveyance of interest, the technician 26 using this technique receives no indication as to how many conveyances of the same service provider require location in this manner. Many utilities and service providers now employ outside contractors to locate conveyances. Often the technicians employed by such contractors may not know in advance the exact number of conveyances that require location.

The present invention overcomes the aforementioned disadvantage by providing a mechanism that operates as part of locating process to alert the technician 24 of the number of conveyances maintained by a particular service provider on the right of way 14. In accordance with the invention, each of confirmation signal generators 22a, 22b and 22c generates a confirmation signal that not only includes information related about the corresponding one of the individual conveyances 12a, 12b and 12c, respectively, but also includes information that identifies the relationship of each conveyance with the others. For example, when the technician 24 locates the conveyance 12a using the receiver 26, the locator display unit 28 associated with the receiver will not only display information specific to the conveyance itself, but also a message "Conveyance 1 of 3 on right-of-way" or something similar. This message alerts the technician 24 of the total number of conveyances, as well as the relationship of each to the others. In a similar manner, when the technician locates the conveyance 12b, the locator display unit 28 will display a message "Conveyance 2 of 3 on right-of-way" or something similar. When the technician locates the conveyance 12c, the locator display unit 28 will display a message "Conveyance 2 of 3 on right-of-way" or something similar.

By virtue of the message displayed on the locator display unit 28, the technician 24 will know the number of conveyances of the same service provider along the right-of-way 14 that require location. In this way, the technician 24 can readily locate all of the conveyances belonging to the same service provider without prior knowledge of the number of such conveyances.

The foregoing discloses a technique for identifying multiple buried conveyances of a single service provider running along a common right-of-way. The above-described embodiments merely illustrate the principles of the invention. Those skilled in the art may make various modifications and changes that will embody the principles of the invention and fall within the spirit and scope thereof.

What is claimed is:

1. A method for identifying multiple conveyances of a single service provider on a common right of way, comprising the steps of:

impressing on each conveyance of the same service provider a locating signal of a prescribed frequency; and impressing a pulsed confirmation signal on each conveyance of the same service provider, wherein the pulsed confirmation signal is unique to each conveyance and contains information which uniquely identifies said conveyance and which also identifies its relationship with the other conveyances such that when the pulsed confirmation signal is received by a technician, the technician will be alerted to the total number of conveyances belonging to the same service provider along the right-of-way.

2. The method according to claim 1 wherein the pulsed locating signal contains the message "Conveyance X of Y" wherein Y represents the total number of conveyances of the service provider and X represents the order of the conveyance to relative to the others.

3. The method according to claim 1 wherein the pulsed locating signal contains the message "Conveyance X of Y" wherein Y represents the total number of conveyances of the service provider and X represents the order of the conveyance to relative to the others.

4. A method for locating multiple conveyances of a single service provider on a common right of way, comprising the steps of:

impressing on each conveyance of the same service provider a locating signal of a prescribed frequency; and impressing a pulsed confirmation signal on each conveyance of the same service provider, wherein the pulsed confirmation signal is unique to each conveyance and contains information which uniquely identifies said conveyance and which also identifies its relationship with the other conveyances;

receiving the locating signal via a receiver to establish the general location of the conveyance; and receiving the pulsed confirmation signal via the receiver to precisely locate the conveyance and to determine to the total number of conveyances belonging to the same service provider along the right-of-way.

5. The method according to claim 4 wherein the step of receiving the pulsed confirmation signal includes determining the relation of the conveyance to the others.

6. Apparatus for identifying multiple conveyances of a single service provider on a common right of way, comprising the steps of:

locate signal generator means for impressing on each conveyance of the same service provider a locating signal of a prescribed frequency; and confirmation signal generator means for impressing a pulsed confirmation signal on each conveyance of the same service provider, wherein the pulsed confirmation signal is unique to each conveyance and contains information which uniquely identifies said conveyance and which also identifies its relationship with the other conveyances such that when the pulsed confirmation signal is received by a technician, the technician will be alerted to the total number of conveyances belonging to the same service provider along the right-of-way.

7. The apparatus according to claim 6 wherein the pulsed locating signal contains the message "Conveyance X of Y" wherein Y represents the total number of conveyances of the service provider and X represents the order of the conveyance to relative to the others.

* * * * *